(12) United States Patent
Zhao et al.

(10) Patent No.: US 12,546,068 B2
(45) Date of Patent: Feb. 10, 2026

(54) STRUCTURE FOR RELIEVING CRACKING OF STEEL BRIDGE DECK

(71) Applicants: CHINA RAILWAY CONSTRUCTION BRIDGE ENGINEERING BUREAU GROUP CO., LTD., Tianjin (CN); Shenyang University of Technology, Shenyang (CN)

(72) Inventors: Jian Zhao, Tianjin (CN); Peng Liu, Panjin (CN); Luming An, Hengshui (CN); Yixuan Chen, Dezhou (CN); Guannan Zhou, Tianjin (CN); Yuanqing Wang, Beijing (CN); Lilong Fan, Tianjin (CN); Pengzhi Zhang, Zhoukou (CN); Yintao Liu, Zhoukou (CN); Hongping Lu, Zhucheng (CN); Xianyu Ji, Gaobeidian (CN)

(73) Assignee: CHINA RAILWAY CONSTRUCTION BRIDGE, Tianjin (CN)

( * ) Notice: Subject to any disclaimer, the term of this patent is extended or adjusted under 35 U.S.C. 154(b) by 580 days.

(21) Appl. No.: 17/985,709

(22) Filed: Nov. 11, 2022

(65) Prior Publication Data

US 2023/0100480 A1 Mar. 30, 2023

(51) Int. Cl.
*E01D 22/00* (2006.01)
*E01D 19/12* (2006.01)

(52) U.S. Cl.
CPC ............ *E01D 22/00* (2013.01); *E01D 19/12* (2013.01)

(58) Field of Classification Search
CPC ........ E01D 19/12; E01D 19/125; E01D 22/00
See application file for complete search history.

(56) References Cited

U.S. PATENT DOCUMENTS

| | | | | |
|---|---|---|---|---|
| 5,561,173 A | * | 10/1996 | Dry | C04B 40/0633 428/321.1 |
| 5,660,624 A | * | 8/1997 | Dry | C04B 40/0092 106/676 |
| 6,261,360 B1 | * | 7/2001 | Dry | B29C 73/22 106/676 |
| 7,022,179 B1 | * | 4/2006 | Dry | A61L 27/48 428/321.1 |
| 2008/0107888 A1 | * | 5/2008 | Dry | C08J 3/241 106/14.39 |
| 2010/0170050 A1 | * | 7/2010 | Inose | B23K 35/3053 219/76.1 |

FOREIGN PATENT DOCUMENTS

| | | | |
|---|---|---|---|
| CN | 212223609 U | 12/2020 | |
| CN | 212612048 U | 2/2021 | |
| CN | 113309015 A | * 8/2021 | ............... E01D 2/00 |
| CN | 214089474 U | 8/2021 | |

(Continued)

*Primary Examiner* — Gary S Hartmann

(57) ABSTRACT

A structure for relieving cracking of a steel bridge deck, which comprises a steel bridge deck and a plurality of U-ribs welded and fixed to a bottom of the steel bridge deck, and further comprises an iron-based shape memory alloy (Fe-SMA) fixing unit, a filling unit, a structural layer, and a test wire. A Fe-SMA having a restoration capability in the case of heating is used and formed into a honeycomb structure.

8 Claims, 8 Drawing Sheets

(56) References Cited

FOREIGN PATENT DOCUMENTS

| | | | | | |
|---|---|---|---|---|---|
| CN | 112458874 | B | * | 3/2022 | ............. E01D 19/00 |
| CN | 112281626 | B | * | 7/2022 | ............. E02D 27/14 |
| CN | 114991028 | B | * | 2/2024 | ............. E01D 22/00 |
| CN | 117661434 | A | * | 3/2024 | ............. E01D 21/00 |
| CN | 118668603 | A | * | 4/2024 | ............... G01B 7/18 |

* cited by examiner

STRUCTURE FOR RELIEVING CRACKING OF STEEL BRIDGE DECK

TECHNICAL FIELD

The present application belongs to the technical field of bridge engineering, and particularly relates to a structure for relieving cracking of a steel bridge deck, a method for making the same, and a method for using the same.

BACKGROUND

A steel bridge deck is regarded as a bridge deck structure formed by welding longitudinal ribs, diaphragms, and top plates together to bear external loads. The steel bridge deck has the advantages of light weight, high bearing capacity, a short construction period, etc., and has been widely used in long-span bridges, landscape bridges, municipal bridges, and other structures.

However, in spite of having outstanding advantages, the steel bridge deck has a serious problem of fatigue cracking under the cyclic action of local vehicle loads because of its complex structure stress, numerous three-dimensional crossed welding seams, high degree of stress concentration, and large residual stress.

At present, the problem of fatigue cracking is generally solved by a method of later construction reinforcement, such as traditional reinforcement technologies of tungsten inert gas (TIG) remelting, a crack closure technology based on impact and crack welding, SPS reinforcement added with combined system reinforcement of a light composite bridge deck structure, and steel plate reinforcement, angle steel reinforcement and U-shaped steel plate reinforcement which are added with fabricated reinforcement of filling light mortar.

The traditional reinforcement method has poor reinforcement effects, and even causes different degrees of damage to an original structure;
the combined system reinforcement needs a long restoration time, and therefore, the traffic is necessary to halt;
and the fabricated reinforcement will bring about nonuniform rigidities of the inner side and outer side of each longitudinal rib and the increase of structural self-weight, which changes mechanical behavior features of an original structural system.

Thus, it is urgent to develop a structure conducive to restoring a steel bridge deck in the prior art.

SUMMARY

The present application provides a structure for relieving cracking of a steel bridge deck on the basis of an iron-based shape memory alloy (Fe-SMA), a method for making the same, and a method for using the same to reinforce a structure of a steel bridge deck which is uncracked, so as to decrease a stress concentration phenomenon generated at a welding part and inhibit generation of fatigue cracks, thereby prolonging the service life of the structure of the steel bridge deck.

To achieve the above objective, the present application provides the following technical solution.

A structure for relieving cracking of a steel bridge deck comprises a steel bridge deck 1 and a plurality of U-ribs welded and fixed to a bottom of the steel bridge deck, and further comprises Fe-SMA fixing units, filling units, a structural layer, and test wires, wherein a plurality of Fe-SMA fixing units are arranged in a length direction of the steel bridge deck, and each Fe-SMA fixing unit is arranged at a top of the steel bridge deck and above a welding connection part between the corresponding U-rib and the steel bridge deck;
a reserved filling space is defined between every two adjacent Fe-SMA fixing units;
the filling unit is arranged in the reserved filling space;
the structural layer is arranged at tops of the Fe-SMA fixing unit and the filling unit;
positive and negative wiring holes are formed in the structural layer; and the test wires include a positive test wire and a negative test wire, wherein the positive test wire penetrates through the positive and negative wiring holes to be electrically connected to one ends of each set of Fe-SMA fixing units in sequence, and the negative test wire penetrates through the positive and negative wiring holes to be electrically connected to the other ends of each set of Fe-SMA fixing units in sequence.

Further, an orthogonal projection at a center of each Fe-SMA fixing unit coincides with a center of the welding connection part between the corresponding U-rib and the steel bridge deck, and the Fe-SMA fixing unit is of an arc-shaped structure; and a radius of curvature of the arc-shaped structure is R=42+/−5 mm, and a radian of an arc is α=1.92+/−0.2 Rad.

Further, the arc-shaped structure is composed of a plurality of orthohexagonal honeycomb Fe-SMAs distributed evenly.

Further, each Fe-SMA fixing unit is connected to the steel bridge deck with an adhesive.

Further, the structural layer comprises a carbon fiber cloth and an asphalt concrete layer, wherein the carbon fiber cloth covers top faces of the filling unit and the Fe-SMA, and the asphalt concrete layer is arranged on a top face of the carbon fiber cloth.

Further, the carbon fiber cloth has a thickness of 0.333 mm; the asphalt concrete layer has a thickness of 20+/−5 mm; and the filling unit is asphalt concrete.

Further, a cover plate covers the positive and negative wiring holes, and a polymer-modified asphalt waterproof coating of 5 mm is coated on the cover plate; the positive and negative wiring holes include a positive wiring hole and a negative wiring hole; and an end of a positive test wire is arranged in the positive wiring hole to form a positive seat, and an end of a negative test wire is arranged in the negative wiring hole to form a negative seat.

A method for making the above-mentioned structure for relieving cracking of a steel bridge deck comprises:
step 1: laying the steel bridge deck prefabricated in a factory, and cleaning a top face of the steel bridge deck with propyl alcohol;
step 2: laying each Fe-SMA fixing unit of the arc-shaped structure above the welding connection part between the steel bridge deck and the corresponding U-rib, and fixedly connecting the Fe-SMA fixing unit to the steel bridge deck with the adhesive;
step 3: laying the filling unit in a reversed filling space between every two adjacent Fe-SMA fixing units;
step 4: laying the structural layer on the top faces of the Fe-SMA fixing unit and the filling unit; and
step 5: enabling the test wires to penetrate through the positive and negative wiring holes to be electrically connected to each Fe-SMA fixing unit.

A method for using the above-mentioned structure for relieving cracking of a steel bridge deck comprises:

step 1: electrically connecting the test wires to a resistivity meter to measure a value of resistivity of the Fe-SMA fixing unit;

step 2: calculating a change value of the resistivity of the Fe-SMA fixing unit; and step 3: when deformation of the Fe-SMA fixing unit exceeds 7+/−2 mm, powering on the Fe-SMA fixing unit to make the Fe-SMA fixing unit be restored to its original state.

According to the present application, the Fe-SMA fixing units are used to restore the structure of the steel bridge deck; a Fe-SMA has a restoration capability in the case of heating, and thus can restore a deformed structure of the steel bridge deck which is uncracked, so as to decrease a stress concentration phenomenon generated at a welding part and inhibit generation of fatigue cracks. Therefore, the service life of the structure of the steel bridge deck can be prolonged.

The Fe-SMA fixing unit of the present application is of the arc-shaped structure. This structure has no sharp, and thus can effectively avoid an influence of stress concentration on the steel bridge deck; furthermore, the Fe-SMA fixing unit internally has a honeycomb structure, and the honeycomb structure has light weight, good stability, and a capability of absorbing vibration and shear deformation, and has low elastic modulus, so as to effectively reduce a stress amplitude of the steel bridge deck.

The Fe-SMA fixing units of the present application are arranged at intervals, and the asphalt concrete is poured between every two adjacent Fe-SMA fixing units, such that rigid materials and flexible materials are alternatively arranged; this structure can effectively reduce vibration transmission of a pure asphalt concrete pavement that is generated by driving of vehicles and shear deformation of the pure asphalt concrete pavement that is caused by braking of the vehicles. As a relatively flexible material, the Fe-SMA fixing unit can absorb part of vibration and the shear deformation, thereby relieving fatigue of a welding part of the bridge deck.

Wherein, 1—steel bridge deck; 2—U-rib; 3—welding seam; 4—Fe-SMA fixing unit; 5—adhesive; 6—asphalt concrete layer; 7—carbon fiber cloth; 8—test wire; 9—positive and negative wiring hole; 10—cover plate; 11—waterproof coating.

DETAILED DESCRIPTION OF THE EMBODIMENTS

The technical solutions of the present application will be clearly and completely described below with reference to the accompanying drawings. Apparently, the embodiments described are merely some of the embodiments of the present application, rather than all of the embodiments.

In order to illustrate the technical solutions in the specific implementations of the present application or in the prior art more clearly, the accompanying drawings to be used in the description of the specific implementations or the prior art will be briefly introduced below. Obviously, the accompanying drawings in the following description show some of the implementations of the present application, and those of ordinary skill in the art can obtain other drawings based on these accompanying drawings without creative effort.

Generally, components in the embodiments of the present application that are described and shown in the accompanying drawings herein can be arranged and designed into various configurations.

Therefore, the following detailed descriptions of the embodiments of the present application provided in the accompanying drawings are not intended to limit the scope of protection of the present application, but merely show selected embodiments of the present application.

Figure 1:
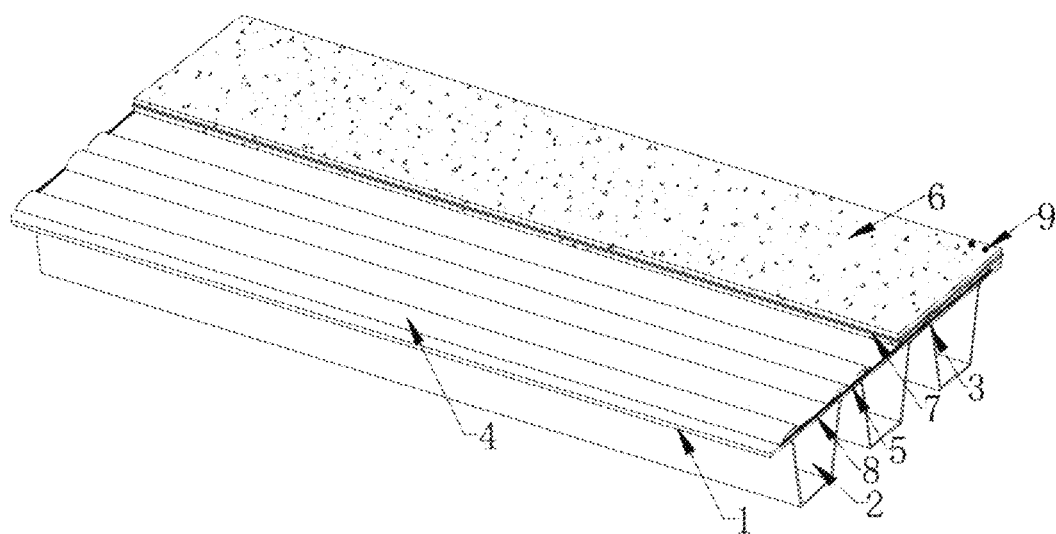
FIG. 1 is a schematic diagram of a structure for relieving cracking of a steel bridge deck on the basis of a Fe-SMA.
Figure 2:
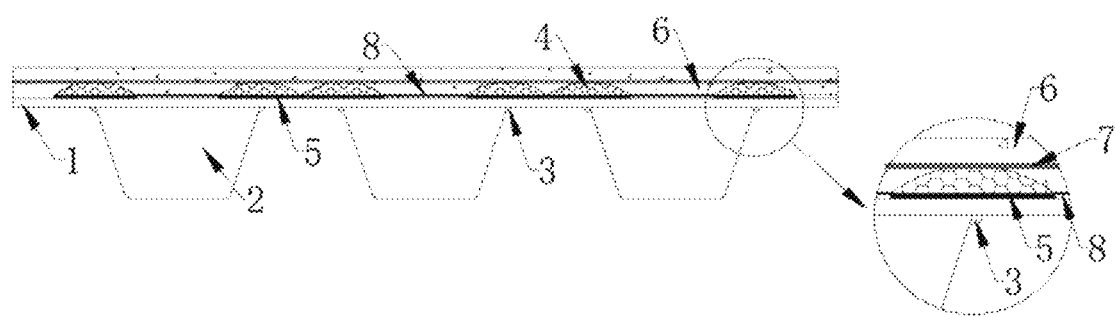
FIG. 2 is a side view of the structure for relieving cracking of a steel bridge deck on the basis of a memory alloy.
Figure 3:
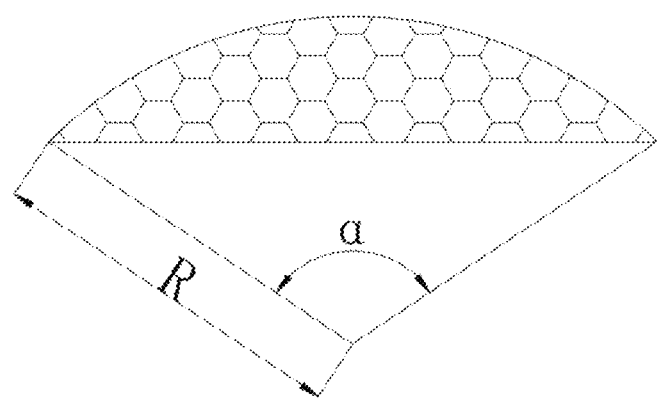
FIG. 3 is a dimensional drawing of the memory alloy.

As shown in FIG. 1 and FIG. 2, a structure for relieving cracking of a steel bridge deck comprises a steel bridge deck 1 and a plurality of U-ribs 2 arranged at a bottom of the steel bridge deck 1, and further comprises Fe-SMA fixing units 4, filling units, a structural layer, and test wires 8, wherein a plurality of Fe-SMA fixing units 4 are arranged in a length direction of the steel bridge deck 1, and each Fe-SMA fixing unit 4 is arranged at a top of the steel bridge deck 1 and above a welding connection part between the corresponding U-rib 2 and the steel bridge deck 1; a reserved filling space is defined between every two adjacent Fe-SMA fixing units 4; the filling unit is arranged in the reserved filling space; the structural layer is arranged at tops of the Fe-SMA fixing unit 4 and the filling unit; positive and negative wiring holes 9 are formed in the structural layer; and the test wires 8 penetrate through the positive and negative wiring holes 9 to be electrically connected to each Fe-SMA fixing unit 4.

According to the present application having such structure, the Fe-SMA fixing units 4 are used to restore a structure of the steel bridge deck 1; a Fe-SMA has a restoration capability in the case of heating, and thus may restore a deformed structure of the steel bridge deck 1 which is uncracked, so as to decrease a stress concentration phenomenon generated at a welding part and inhibit generation of fatigue cracks.

Therefore, the service life of the structure of the steel bridge deck 1 may be prolonged.

An orthogonal projection at a center of each Fe-SMA fixing unit 4 in the embodiment of the present application coincides with a center of the welding connection part between the corresponding U-rib 2 and the steel bridge deck 1, and the Fe-SMA fixing unit 4 is of an arc-shaped structure; and a radius of curvature of the arc-shaped structure is R=42+/−5 mm, and a radian of an arc is α=1.92+/−0.2 Rad.

The steel bridge deck 1 and the Fe-SMA fixing units 4 are prefabricated in a factory.

The Fe-SMA fixing unit 4 is evenly and entirely filled with an orthohexagonal honeycomb structure with an aperture of 8 mm.

The above-mentioned honeycomb structure is obtained by being formed according to the following method: a Fe-SMA plate is subjected to isothermal heat treatment at 450° C. for 7 hours, and is then quenched with water, and a plurality of gaps spaced at regular intervals and equal in length are formed in the Fe-SMA plate by processing; then, hexagonal iron bars with a certain diameter penetrate through the gaps; and finally, the Fe-SMA plate through which the iron bars penetrate is put into a heating furnace to be heated to 600° C., kept at the temperature for 0.4 hour, discharged from the heating furnace, and quenched with water, and then the hexagonal iron bars are drawn out.

As the honeycomb structure is composed of many dense honeycomb cells which are restrained by one another, the Fe-SMA fixing units just like many small I-beams may bear pressure from the direction of the steel bridge deck 1 in a dispersing manner, so that the steel bridge deck is uniformly stressed, and the strength of the pressure borne by the steel bridge deck is ensured.

Each Fe-SMA fixing unit 4 is connected to the steel bridge deck 1 with an adhesive 5. This has the advantage that the Fe-SMA fixing unit 4 is formed into the arc-shaped honeycomb structure.

The honeycomb structure has no sharp, and thus may effectively avoid an influence of stress concentration on the steel bridge deck 1; and the honeycomb structure has low elastic modulus, and thus might effectively reduce a stress amplitude of the steel bridge deck 1.

Specifically, before the adhesive 5 is applied, in order to ensure that a connection part is clean and has no rust, the connection part between the Fe-SMA fixing unit 4 and the steel bridge deck 1 is cleaned with propyl alcohol.

A resin adhesive is adopted as the adhesive 5; and N, N'-(4,4'-diphenylmethane) bismaleimide resin (BMI) contained in the resin adhesive serves as matrix resin, epoxy resin E-51 serves as a modifying agent, and (4,4'-diaminodiphenylmethane) (MDA) serves as a curing agent.

Wherein a ratio of E-51:BMI:MDA is equal to 1:(0.35-0.45):1. After being mixed, the E-51, the BMI, and the MDA are stirred at a velocity of 400-450 r/minute for 20+/−5 minutes.

At this time, the adhesive has the best heat resistance and viscosity. The resin adhesive has the advantages of good toughness and high bonding strength, and a cured resin adhesive has good insulation performance and high toughness and impact resistance.

The resin adhesive also has the advantage of excellent heat resistance and can meet the condition under which the Fe-SMA fixing unit 4 can be restored to its original state in the case of heating.

Figure 4:
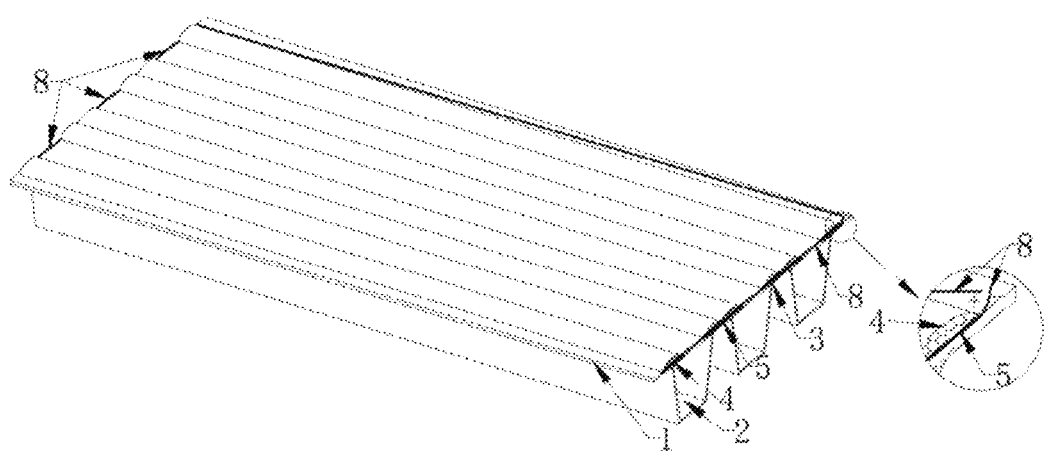
FIG. 4 is an arrangement diagram of a Fe-SMA laying structure and test wires.
Figure 5:
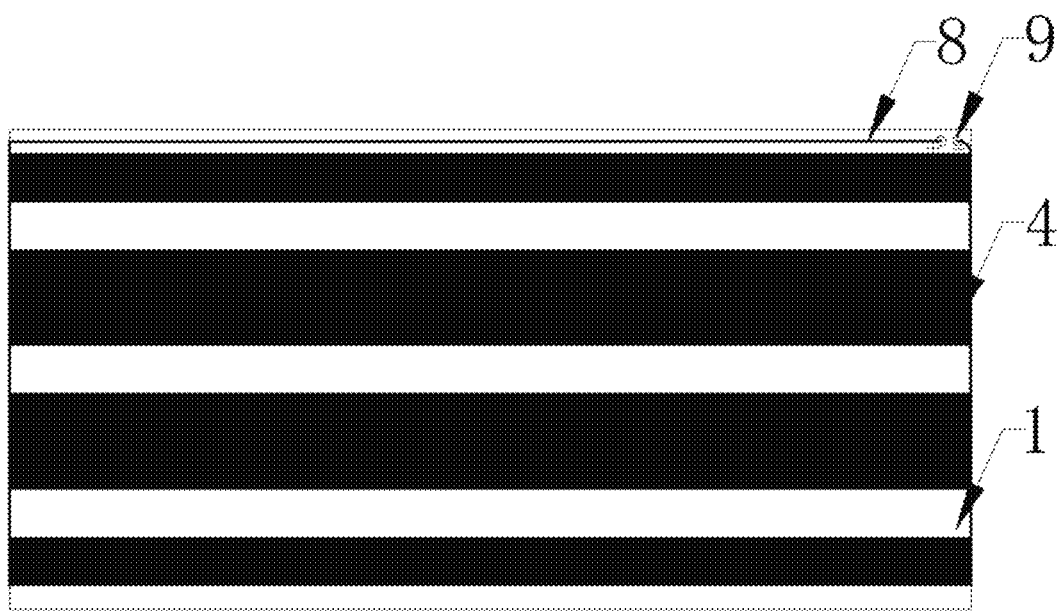
FIG. 5 is an arrangement top view of the Fe-SMA laying structure and the test wires.
Figure 6:
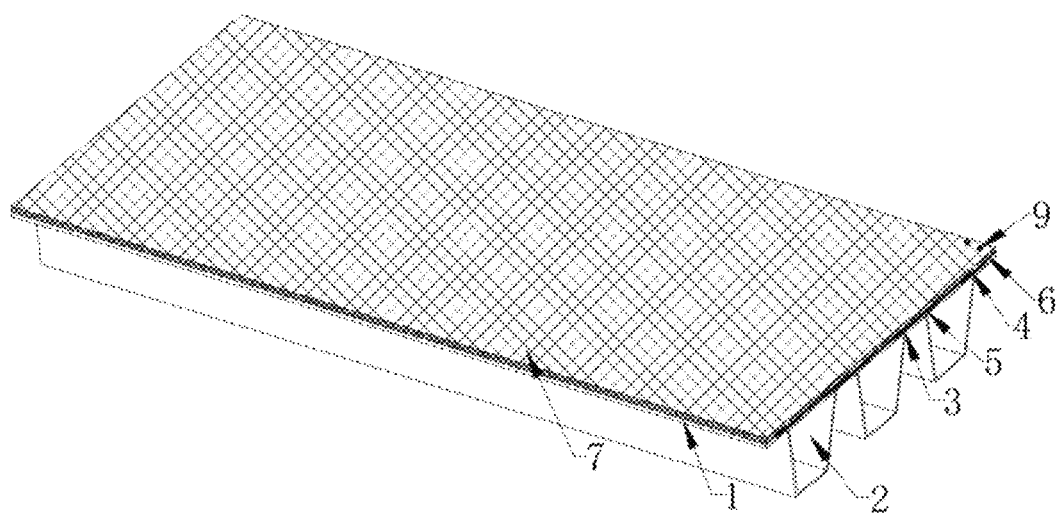
FIG. 6 is a laying drawing of a layer of the Fe-SMA laying structure.

As shown in FIG. 4, FIG. 5, and FIG. 6, the structural layer in the embodiment of the present application comprises a carbon fiber cloth 7 and an asphalt concrete layer 6, wherein the carbon fiber cloth 7 covers top faces of the filling unit and the Fe-SMA fixing unit 4, and the asphalt concrete layer 6 is arranged on a top face of the carbon fiber cloth 7.

Specifically, asphalt concrete is spread in the reserved filling space between every two adjacent Fe-SMA fixing units 4, and is fixed by the Fe-SMA fixing units 4 to be prevented from split away from an interlayer due to an insufficient bonding force in the interlayer.

After the asphalt concrete is completely spread, the carbon fiber cloth 7 with a thickness of 0.333 mm is laid on the asphalt concrete, and the cast-in-situ asphalt concrete layer 6 of 20+/−5 mm is laid on the carbon fiber cloth 7.

The Fe-SMA fixing units 4 are arranged at intervals, and the asphalt concrete is poured between every two adjacent Fe-SMA fixing units, such that rigid materials and flexible materials are alternatively arranged, effectively reducing shear deformation of a pure asphalt concrete pavement that is caused by braking of vehicles.

As a relatively flexible material, a honeycomb Fe-SMA can absorb part of the shear deformation. The carbon fiber cloth 7 plays of role of reinforcing the laying below.

Because the carbon fiber cloth 7 has extremely high strength, ultra-light weight, high temperature resistance, and high pressure resistance, each Fe-SMA fixing unit 4 can be maintained for a period of time by means of a structure of the asphalt concrete and the carbon fiber cloth 7 when deformed, so as to ensure that each Fe-SMA fixing unit 4 will not be deformed more seriously in a restoration process.

Figure 7:
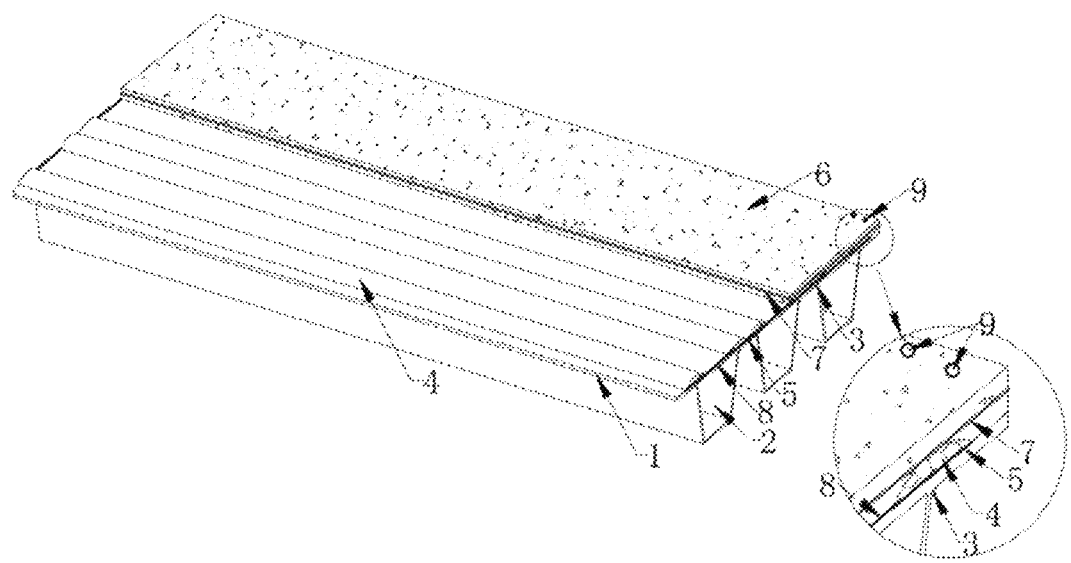
FIG. 7 is a laying detail drawing of the structure for relieving cracking of a steel bridge deck on the basis of a memory alloy.
Figure 8:
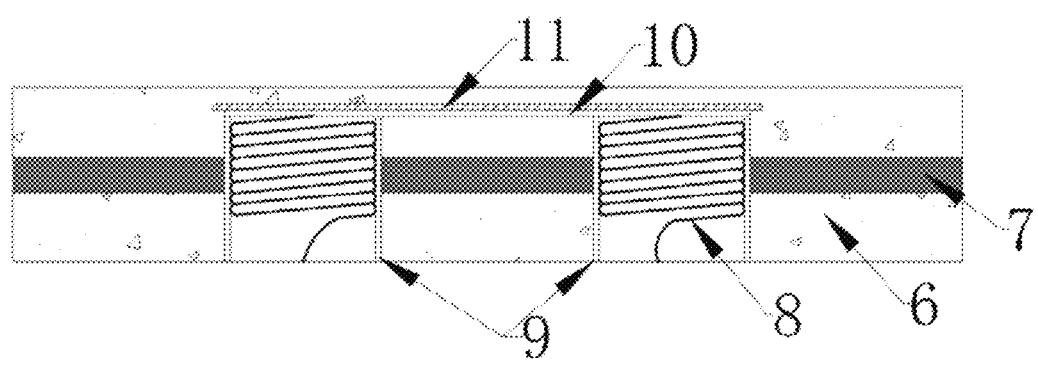
FIG. 8 is a laying detail drawing showing positions of wiring holes.

FIG. 7 and FIG. 8 show laying detail drawings of the structure for relieving cracking of a steel bridge deck on the basis of a memory alloy. Two wiring holes, namely the positive and negative wiring holes 9 with a diameter of 10-15 mm, are reserved in each bridge deck, so as to conveniently measure resistivity of the Fe-SMA fixing unit 4 and power on the Fe-SMA fixing unit 4.

After a bridge is open to traffic, the Fe-SMA fixing unit 4 will be deformed and subjected to certain stress under the repeated action of the vehicles; as a result, the resistivity of the Fe-SMA fixing unit 4 is changed; and a change value of the resistivity can be obtained by connecting the test wires 8 of the Fe-SMA fixing unit 4 to a resistivity meter.

The resistivity of the Fe-SMA fixing unit 4 is measured once every six months; and when it is measured that deformation of the steel bridge deck 1 exceeds 7±2 mm, the Fe-SMA fixing unit 4 is powered on to be heated, so as to produce strain and be restored to its original state.

Under the action of stress restoration of the Fe-SMA fixing unit 4, the fatigue of the steel bridge deck 1 is effectively reduced, and an impact resistant capability of the steel bridge deck 1 is enhanced, so that the fatigue cracks are decreased.

A processing method of the wiring hole is as follows: the cylindrical wiring hole is made of q370 and has a thickness of 5-6 mm, a length of 60% of a laying layer of the bridge deck, and a round hole with an internal diameter of 10-15 mm.

A cover plate covering on a connecting hole is a rectangular cover plate made of the q370 and having a side length of 25-30 mm and a thickness of 8-10 mm; a polymer-modified asphalt waterproof coating 11 of 5 mm for roads and bridges is coated on the rectangular cover plate; the positive and negative wiring holes 9 include a positive wiring hole and a negative wiring hole;

an end of a positive test wire is arranged in the positive wiring hole to form a positive seat, and an end of a negative test wire is arranged in the negative wiring hole to form a negative seat; and when the resistivity needs to be measured, a positive electrode of the resistivity meter is electrically connected to the positive seat, and a negative electrode of the resistivity meter is electrically connected to the negative seat.

A method for making a structure for relieving cracking of a steel bridge deck comprises:

step 2: each Fe-SMA fixing unit 4 of an arc-shaped structure is laid above a welding connection part between a steel bridge deck 1 and a corresponding U-rib, and the Fe-SMA fixing unit 4 is fixedly connected to the steel bridge deck 1 with an adhesive 5;

step 3: a filling unit is laid in a reversed filling space between every two adjacent Fe-SMA fixing units 4;

step 4: a structural layer is laid on top faces of the Fe-SMA fixing unit 4 and the filling unit; and step 5: test wires 8 are enabled to penetrate through positive and negative wiring holes 9 to be electrically connected to each Fe-SMA fixing unit 4.

A method for using the above-mentioned structure for relieving cracking of a steel bridge deck comprises:
- step 1: the test wires 8 are electrically connected to a resistivity meter first to measure an original value of the resistivity of the Fe-SMA fixing unit 4;
- step 2: the change value of the resistivity of the Fe-SMA fixing unit 4 is measured; and
- step 3: when the deformation of the steel bridge deck 1 exceeds 7+/−2 mm, the change value of the resistivity of the Fe-SMA fixing unit 4 is recorded, a corresponding resistance value measured when the deformation of the steel bridge deck 1 exceeds 7+/−2 mm is taken as a reference value for later measurement, and the Fe-SMA fixing unit 4 is powered on to be restored to the original state.

Obviously, the above implementations of the present application are merely examples to clearly explain the present application, but not limitations to the implementations of the present application.

Changes or modifications in other forms can be made by those of ordinary skill in the art on the basis of the above descriptions, and it is impossible to exhaustively describe all the implementations herein.

All obvious changes or modifications derived from the technical solutions of the present application also fall within the scope of protection of the present application.

What is claimed is:

1. A structure for relieving cracking of a steel bridge deck, comprising a steel bridge deck and a plurality of U-ribs welded and fixed to a bottom of the steel bridge deck, and further comprising a plurality of iron-based shape memory alloy fixing units, filling units, a structural layer, and test wires;
   the plurality of Fe-SMA fixing units are arranged in a length direction of the steel bridge deck, and each Fe-SMA fixing unit is arranged at a top of the steel bridge deck and above a welding connection part between the corresponding U-rib and the steel bridge deck;
   a reserved filling space is defined between two adjacent Fe-SMA fixing units;
   the filling unit is arranged in the reserved filling space;
   the structural layer is arranged at tops of the Fe-SMA fixing unit and the filling unit; and
   positive and negative wiring holes are formed in the structural layer; and the test wires include a positive test wire and a negative test wire, wherein the positive test wire penetrates through the positive and negative wiring holes and electrically connects to one ends of each set of Fe-SMA fixing units respectively, and the negative test wire penetrates through the positive and negative wiring holes and electrically connects to the other ends of each set of Fe-SMA fixing units respectively.

2. The structure for relieving cracking of a steel bridge deck according to claim 1, wherein an orthogonal projection at a center of each Fe-SMA fixing unit coincides with a center of the welding connection part between the corresponding U-rib and the steel bridge deck, and the Fe-SMA fixing unit is of an arc-shaped structure; and a radius of curvature of the arc-shaped structure is R=42 mm+/−5 mm, and an radian of the arc-shaped structure is $\alpha$=1.92+/−0.2 Rad.

3. The structure for relieving cracking of a steel bridge deck according to claim 2, wherein the arc-shaped structure is composed of a plurality of orthohexagonal honeycomb Fe-SMAs distributed evenly.

4. The structure for relieving cracking of a steel bridge deck according to claim 1, wherein each Fe-SMA fixing unit is connected to the steel bridge deck with an adhesive.

5. The structure for relieving cracking of a steel bridge deck according to claim 1, wherein the structural layer comprises a carbon fiber cloth and an asphalt concrete layer, wherein the carbon fiber cloth covers top faces of the filling unit and the Fe-SMA fixing unit, and the asphalt concrete layer is arranged on a top face of the carbon fiber cloth.

6. The structure for relieving cracking of a steel bridge deck according to claim 5, wherein the carbon fiber cloth has a thickness of 0.333 mm; the asphalt concrete layer has a thickness of 20+/−5 mm; and the filling unit is asphalt concrete.

7. The structure for relieving cracking of a steel bridge deck according to claim 1, wherein a cover plate covers the positive and negative wiring holes, and a polymer-modified asphalt waterproof coating of 5 mm is coated on the cover plate; the positive and negative wiring holes include a positive wiring hole and a negative wiring hole; and an end of the positive test wire is arranged in the positive wiring hole to form a positive seat, and an end of the negative test wire is arranged in the negative wiring hole to form a negative seat.

8. A method for making the structure for relieving cracking of a steel bridge deck according to claim 1, comprising:
   - step 1: laying the steel bridge deck prefabricated in a factory, and cleaning a top face of the steel bridge deck with propyl alcohol;
   - step 2: laying each Fe-SMA fixing unit of an arc-shaped structure above a welding connection part between the steel bridge deck and the corresponding U-rib, and fixedly connecting the Fe-SMA fixing unit to the steel bridge deck with an adhesive;
   - step 3: laying the filling unit in a reversed filling space between two adjacent Fe-SMA fixing units;
   - step 4: laying the structural layer on top faces of the Fe-SMA fixing unit and the filling unit; and
   - step 5: enabling the test wires to penetrate through the positive and negative wiring holes and to electrically connect to each Fe-SMA fixing unit.

* * * * *